(12) United States Patent
Martin (10) Patent No.: US 7,278,532 B2
(45) Date of Patent: Oct. 9, 2007

(54) CONVEYING APPARATUS

(75) Inventor: Kevin Joseph Martin, Mullaley (AU)

(73) Assignee: Martin Gessner Pty Ltd, New South Wales (AU)

( * ) Notice: Subject to any disclaimer, the term of this patent is extended or adjusted under 35 U.S.C. 154(b) by 173 days.

(21) Appl. No.: 10/493,810

(22) PCT Filed: Oct. 22, 2002

(86) PCT No.: PCT/AU02/01431

§ 371 (c)(1),
(2), (4) Date: Nov. 12, 2004

(87) PCT Pub. No.: WO03/037757

PCT Pub. Date: May 8, 2003

(65) Prior Publication Data

US 2005/0061622 A1    Mar. 24, 2005

(30) Foreign Application Priority Data

Oct. 29, 2001   (AU)  ..................... PR8543

(51) Int. Cl.
*B65G 17/18* (2006.01)
(52) U.S. Cl. ...................... 198/800; 198/799
(58) Field of Classification Search ............... 198/797, 198/798, 799, 800, 801
See application file for complete search history.

(56) References Cited

U.S. PATENT DOCUMENTS

| | | | |
|---|---|---|---|
| 2,069,886 A | 2/1937 | Joslin | |
| 2,078,770 A | 4/1937 | Morton | |
| 3,575,281 A * | 4/1971 | Sutton | 198/800 |
| 4,171,042 A * | 10/1979 | Meissner | 198/386 |
| 4,643,495 A * | 2/1987 | Pepping et al. | 198/800 |
| 5,387,260 A | 2/1995 | Gennari et al. | 198/798 |
| 5,407,264 A * | 4/1995 | Giegerich et al. | 198/799 |
| 5,529,165 A | 6/1996 | Shupert | 198/347.3 |

FOREIGN PATENT DOCUMENTS

| | | |
|---|---|---|
| DE | 4231247 | 3/1994 |
| DE | 19636967 | 3/1998 |
| DE | 3 710 722 | 10/1998 |
| DE | 20109285 | 10/2001 |
| EP | 0 391 357 | 10/1990 |
| EP | 0 521 416 | 1/1993 |
| EP | 0 611 709 | 3/1997 |
| FR | 1.604.815 | 5/1972 |
| FR | 2443985 | 7/1980 |
| JP | 09-203236 | 8/1997 |
| JP | 10-331470 | 12/1998 |
| RU | 1 738 743 | 7/1992 |
| SU | 1247320 | 7/1986 |

* cited by examiner

*Primary Examiner*—James R. Bidwell
(74) *Attorney, Agent, or Firm*—Steptoe & Johnson LLP (57) ABSTRACT

An apparatus for conveying articles includes a transmission element, a plurality of element guides around which the transmission element extends, a drive motor for moving the transmission element, a plurality of article carriages operatively connected to the transmission element for movement therewith, and a guide track for maintaining the article carriages in a selected orientation as they move along the conveying path.

14 Claims, 13 Drawing Sheets

CONVEYING APPARATUS

This invention relates generally to conveying articles. By articles is meant any article, product, animal including persons.

It is an object of the present invention to provide a conveying apparatus which enables the conveyance of articles in a selected orientation.

The conveying apparatus is suitable for use in many applications and examples of such applications will be referred to later. The many advantages of the apparatus according to the invention will hereinafter become apparent from the following description.

According to one aspect of the present invention there is provided apparatus for conveying articles the apparatus including transmission means which includes an endless transmission element; a plurality of element guide means around which the transmission element extends; drive means for moving the transmission element; a plurality of article carriages operatively connected to the transmission element for movement therewith; and orientation means for maintaining the article carriages in a selected orientation as they move along the conveying path.

The path of travel of the endless transmission element may take any suitable configuration. Furthermore, it may be arranged to extend around any desired number of guides to suit the desired path of travel. It will be appreciated however that the path of travel could be generally vertical, horizontal, inclined or convoluted.

The apparatus may include a mounting assembly associated with each article carriage. Each mounting assembly may include a primary load support member to which an associated article carriage is mounted. Each primary load support member may be connected to the transmission element substantially at a position adjacent to the transmission element. Each article carriage may be operatively mounted to the primary load support member with which it is associated at a position such that bending moments resulting from the weight of the article carriage are minimised. In one form article carriage may include a platform section, the load support member being disposed intermediate opposed ends of the platform section.

In another form each article carriage includes a plurality of platform sections disposed in spaced relation and one above the other, the load support member being disposed intermediate opposed ends of one of the platform sections. Two or more load support members may be provided each being associated with a respective one of said carriages. Such an arrangement minimises the distance between carriages and maximises the number of platform sections per given distance of transmission element.

In one form each carriage may be operatively connected to the endless transmission element in spaced relation from one another there along. Each primary support element may include an axle operatively connected to the transmission element through a mounting bracket, the carriage associated therewith being secured to a sleeve disposed on the axle for relative rotation thereto.

Preferably, two transmission elements are provided which are arranged in spaced apart relation the primary load support members being operatively connected to both transmission elements and extending therebetween.

In one example embodiment of the invention two guide means are provided, one above the other and in spaced relation to one another. In this particular embodiment of the invention the element guide means may be in the form of wheels around which the endless transmission element extends. The endless transmission element may be in the form of a chain and in this particular form of the invention the guides may comprise chain sprockets. It will be appreciated however that in some applications the endless transmission element may take other forms such as for example a cable, belt or the like.

The drive means may take any suitable form. For example, the drive means may be operatively connected to one of the element guide means for causing rotation thereof and in turn movement of the endless transmission element. The drive means may be in the form of a motor such as an electric motor or an engine such as for example an internal combustion engine.

In one form the orientation means may include a guide track having two parallel side sections and opposed end sections. The side sections may each comprise a single guide path and each end section comprises three guide paths. The orientation means may further includes tracking elements in the form of rollers which are arranged to track along the guide paths. The tracking rollers may in one embodiment be operatively connected to a support link which in turn is operatively connected to the sleeve.

In another embodiment the orientation means includes a guide track having two parallel side sections, a central section and opposed end sections. The side sections each comprise a single guide path. The orientation means further includes tracking elements in the form of rollers which are arranged to track along the guide paths, the tracking rollers being operatively connected to a platform.

Preferred embodiments of the invention will hereinafter be described with reference to the accompanying drawings, and in those drawings.

Referring to FIGS. 1 to 6 there is shown a first embodiment of conveying apparatus according to the present invention which is generally indicated at 10 and includes transmission means 12 comprising two spaced apart endless transmission elements 14 in the form of chains 15 which extend around guide means 16 in the form of sprockets 17 and 18. One of the sprockets is operatively connected to a drive motor (not shown) which causes the chains to travel around the sprockets associated therewith. Each transmission means 12 is mounted within a housing 19.

Figure 1:
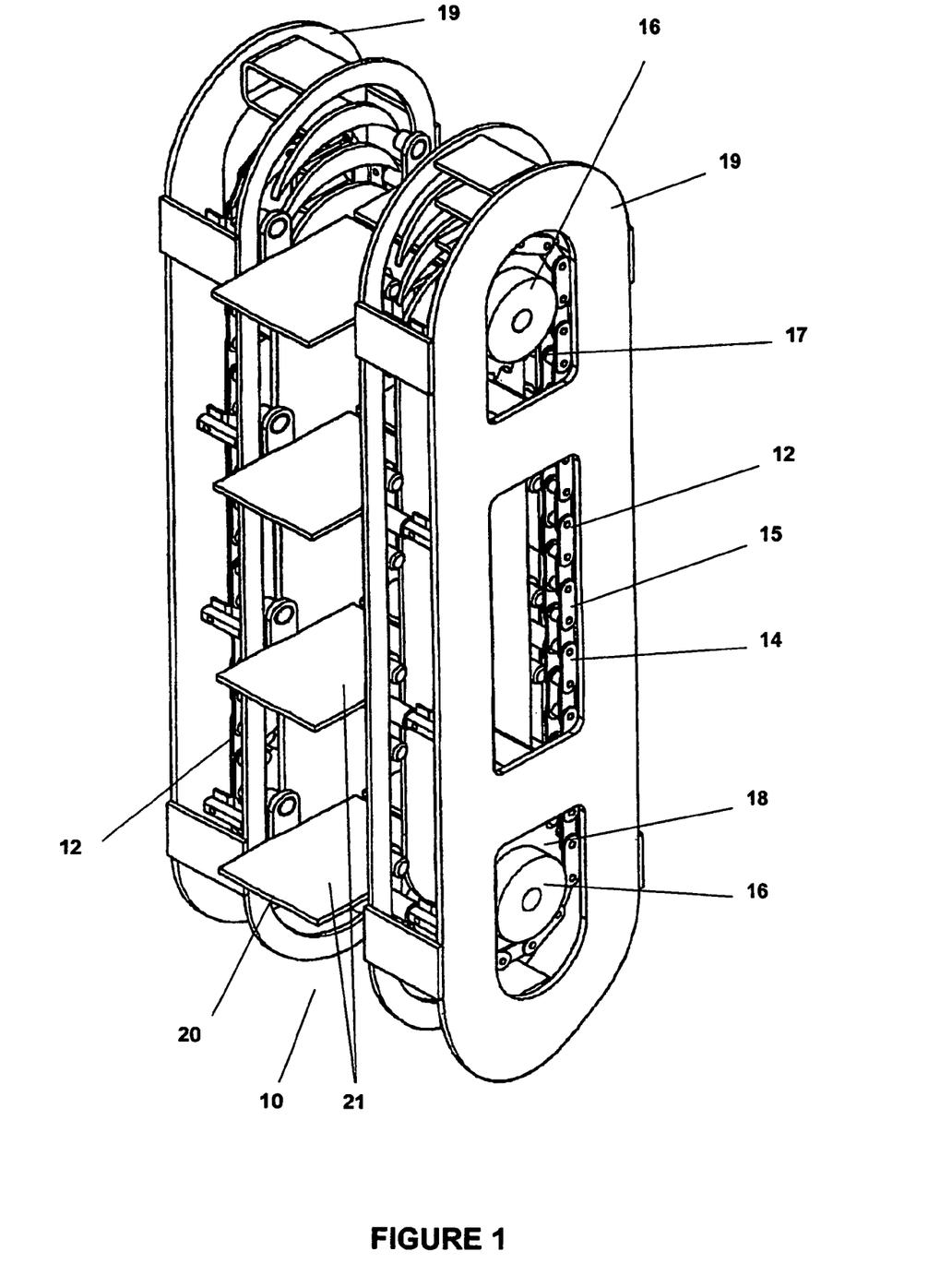
FIG. 1 is a schematic perspective of conveying apparatus according to one embodiment of the present invention.
Figure 2:
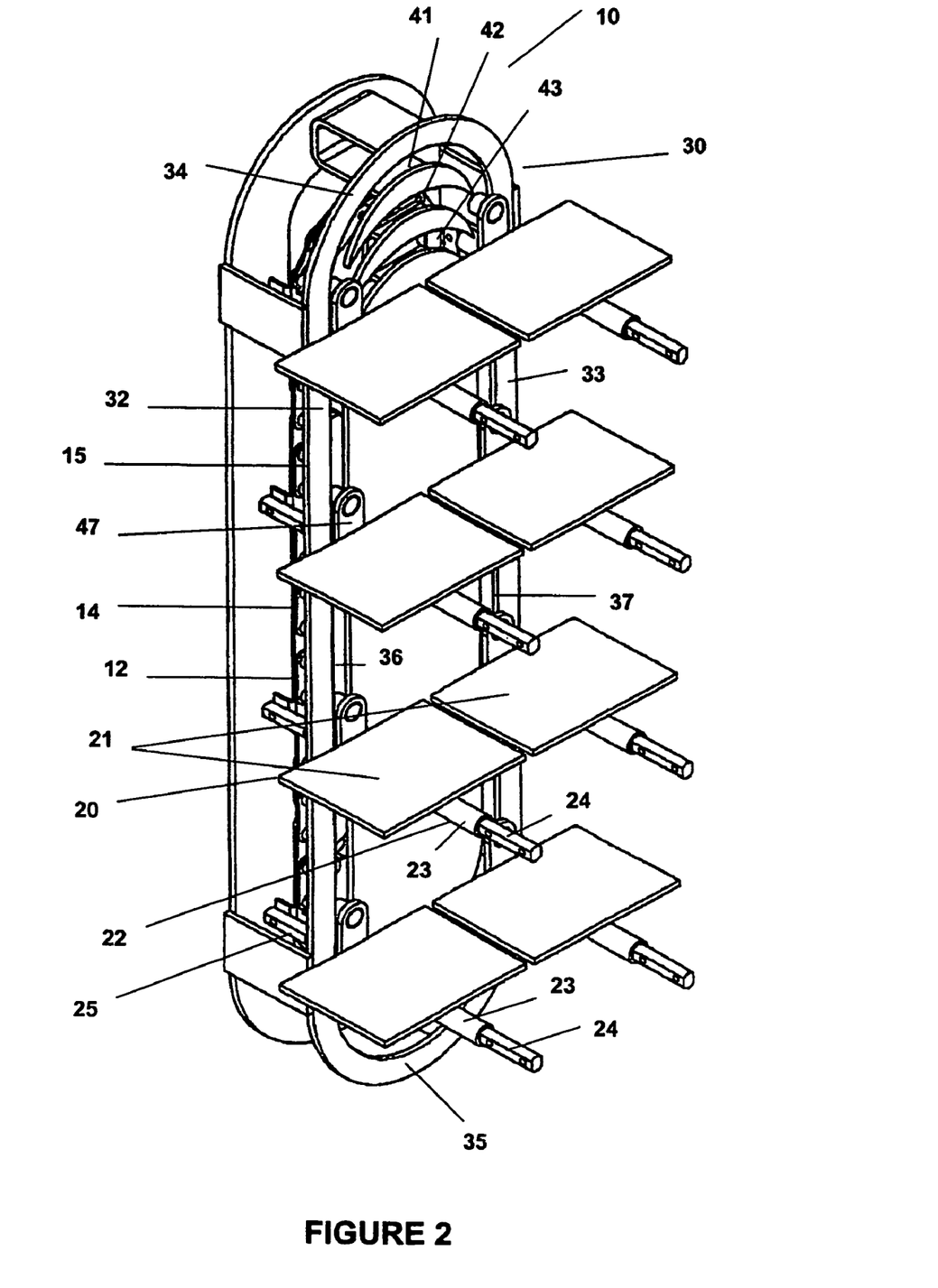
FIG. 2 is a similar view to that of FIG. 1 with part of the apparatus removed.
Figure 3:
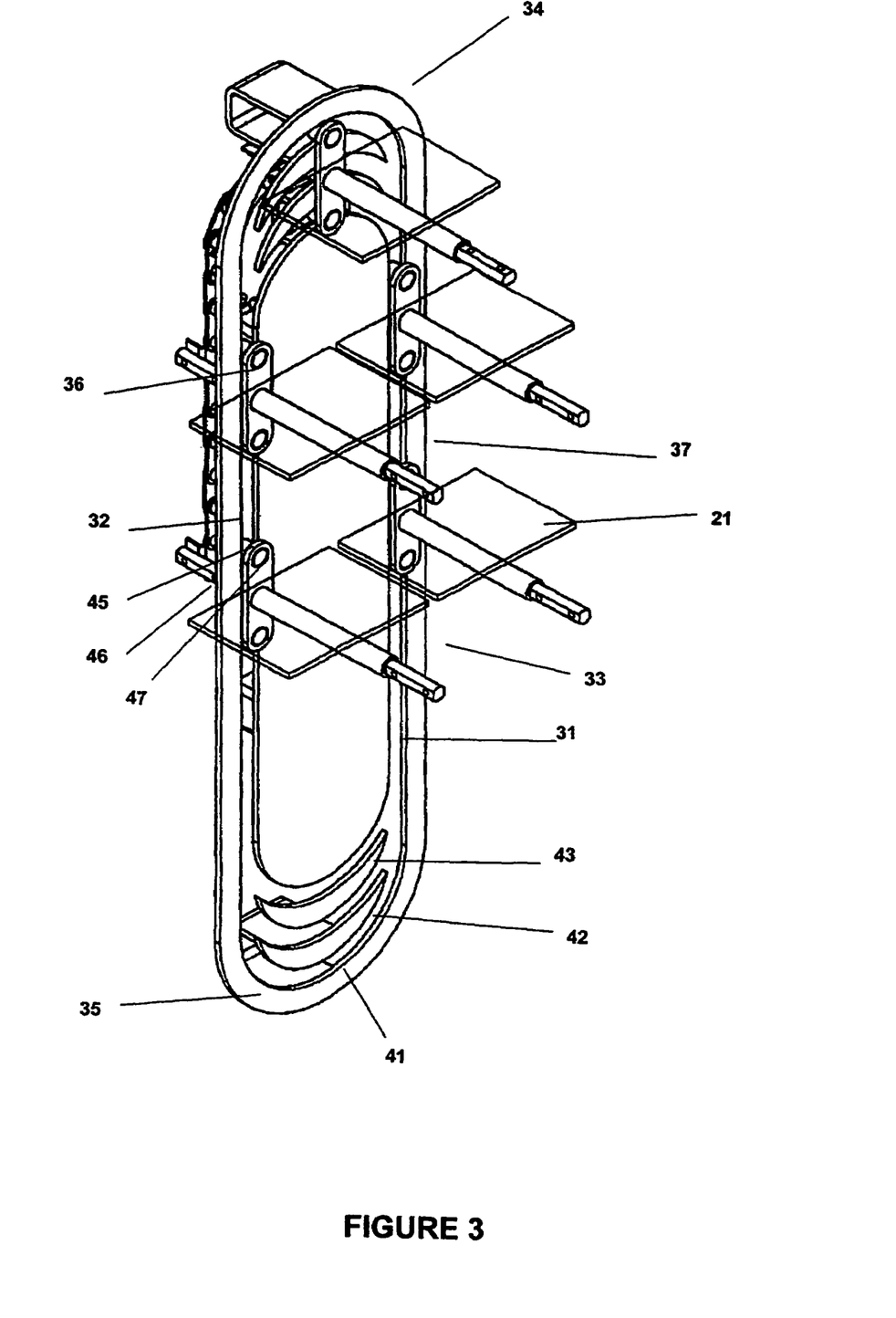
FIG. 3 is a schematic perspective view of part of the apparatus shown in FIGS. 1 and 2.

The apparatus further includes a plurality of article carriages or supports 20 in the form of platforms 21 operatively connected to and disposed between the two chains. To this end each platform 21 is operatively connected to a mounting assembly 22 which includes an axle 24 operatively connected at each end to respective chains 15 via a bracket 25. The platform 21 is mounted on a sleeve 23 which in turn is carried on the axle 24 so that it can rotate relative thereto.

The apparatus further includes orientation means 30 which comprises a guide track 31 having two parallel side sections 32 and 33 and opposed end sections 34 and 35. The side sections each comprise a single guide path 36 and 37 wherein each end section comprises three guide paths 41, 42, 43. The orientation means further includes tracking elements in the form of rollers 45 and 46 which together with the sleeve 23 are arranged to track along selected guide paths (See FIGS. 4 to 6). Tracking rollers 45 and 46 are operatively connected to a support link 47 which in turn is operatively connected to the sleeve 23.

The guide paths are formed by spaces between a central frame member 51 and an outer peripheral frame member 52. At each end there are provided intermediate frame members 53 and 54 (See FIG. 6). The operation of the conveying apparatus of this embodiment will hereinafter be described particularly with reference to FIGS. 3 and 5.

Figure 4A:
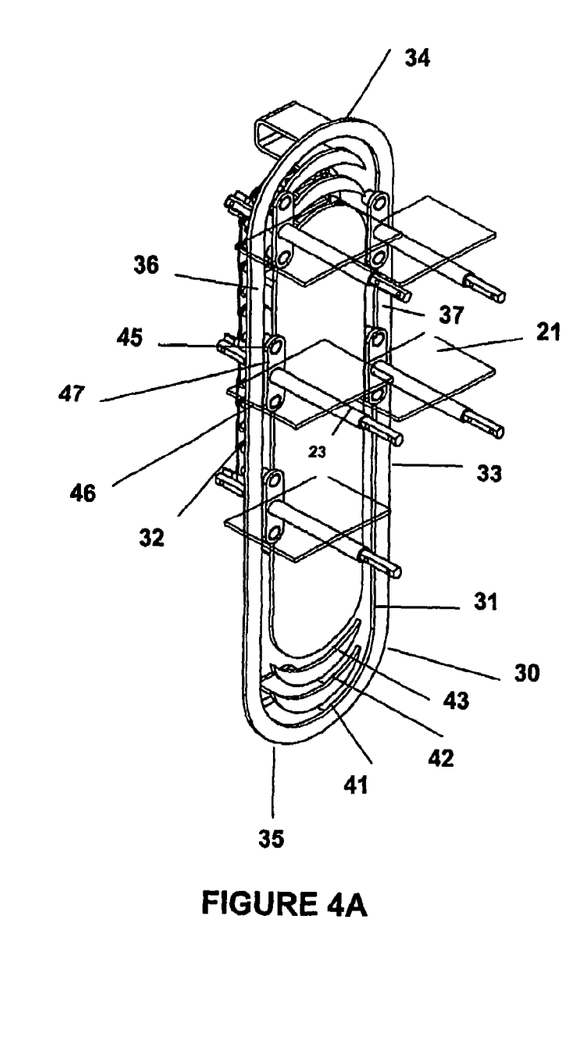
FIGS. 4a, 4b, 5a, 5b, and 6a, 6b are schematic side elevations of the apparatus illustrating how the apparatus shown in FIGS. 1 to 3 operates.
Figure 4B:
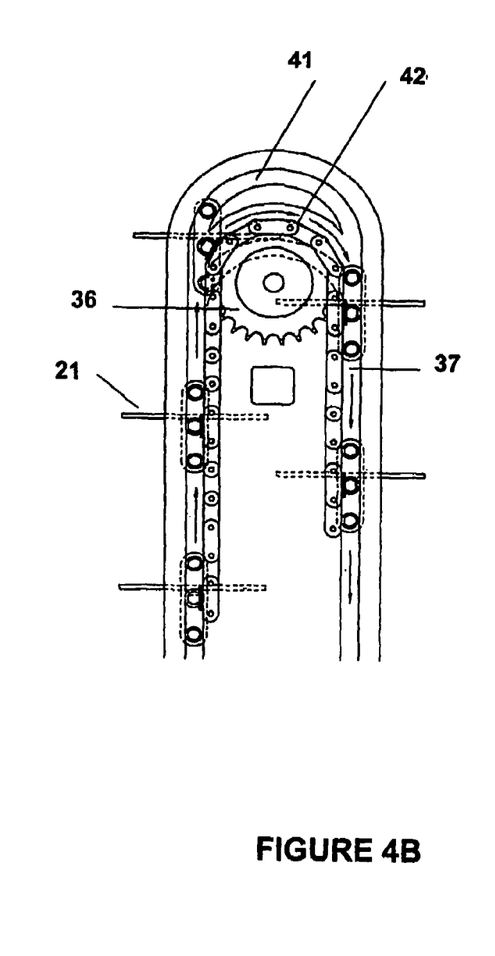
Figure 5A:
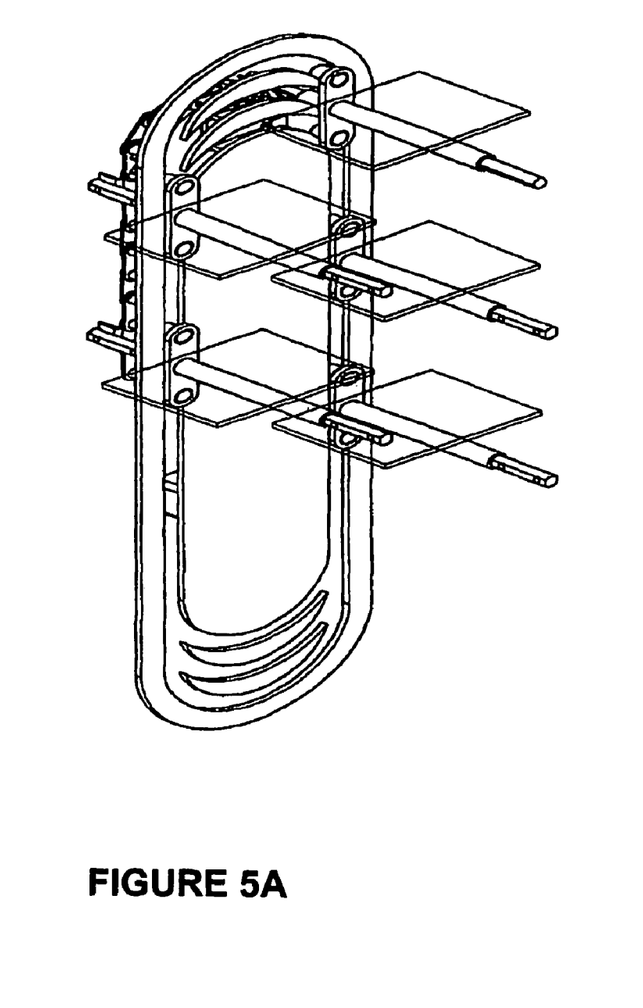
Figure 5B:
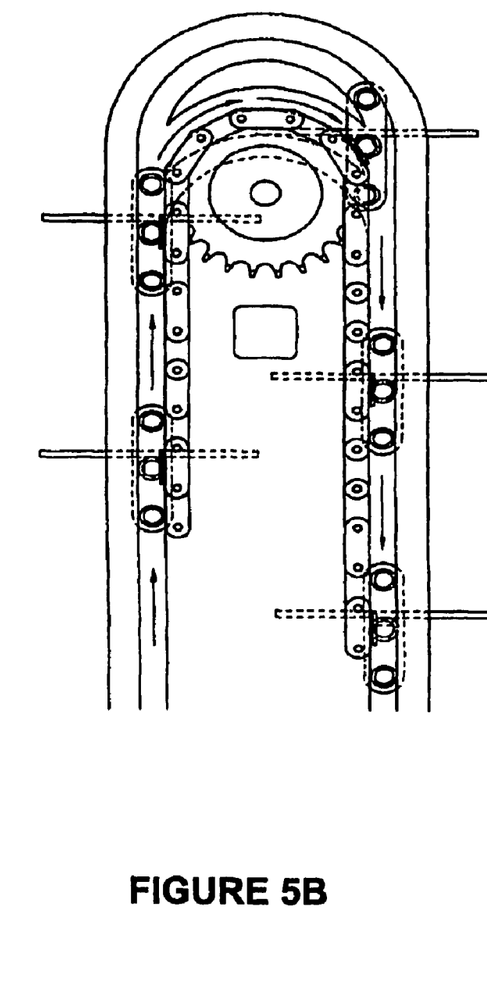
Figure 6A:
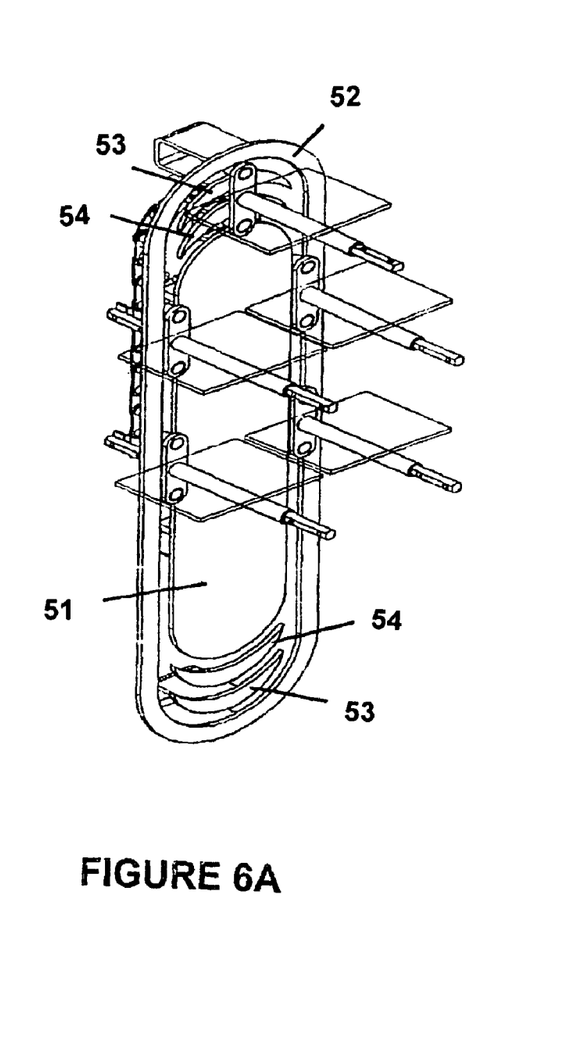
Figure 6B:
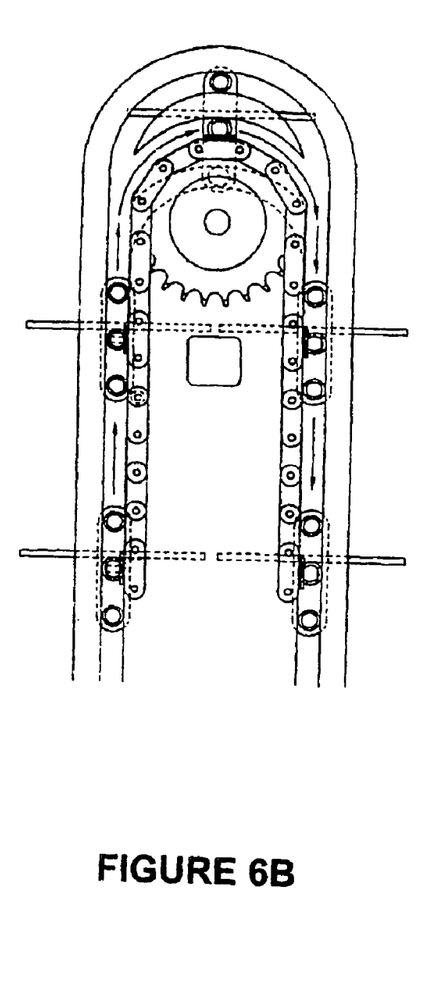

The drive motor is actuated causing movement of the chains 15 around the sprockets 17 and 18. As shown in FIGS. 4(a) and 4(b) one of the platforms 21 is about to move into the upper end section 34 and another platform is about to leave that end section. As the platform enters the end section 34 the tracking roller 45 is caused to enter and move along guide path 41. The curve of the guide path 41 at its entrance then causes the sleeve 23 to move along guide path 42 and tracking roller 46 is subsequently caused to move along guide path 43. Thus, it will be readily apparent that the link 47 always maintains an upright orientation and as such the platform a generally horizontal orientation whether the link is tracking along the side guide paths 36 and 37 or the guide paths at each end. FIGS. 5(a) and 5(b) and 6(a) and 6(b) illustrate the platforms 21 at various positions along the guide path.

Referring to FIGS. 7 to 12 there is shown a second embodiment of conveying apparatus according to the present invention which is generally indicated at 110 and includes transmission means 112 comprising two spaced apart endless transmission elements 114 in the firm of chains 115 which extend around guide means 116 in the form of sprockets 117 and 118. One of the sprockets is operatively connected to a drive motor (not shown) which causes the chains to travel around the sprockets associated therewith.

Figure 7:
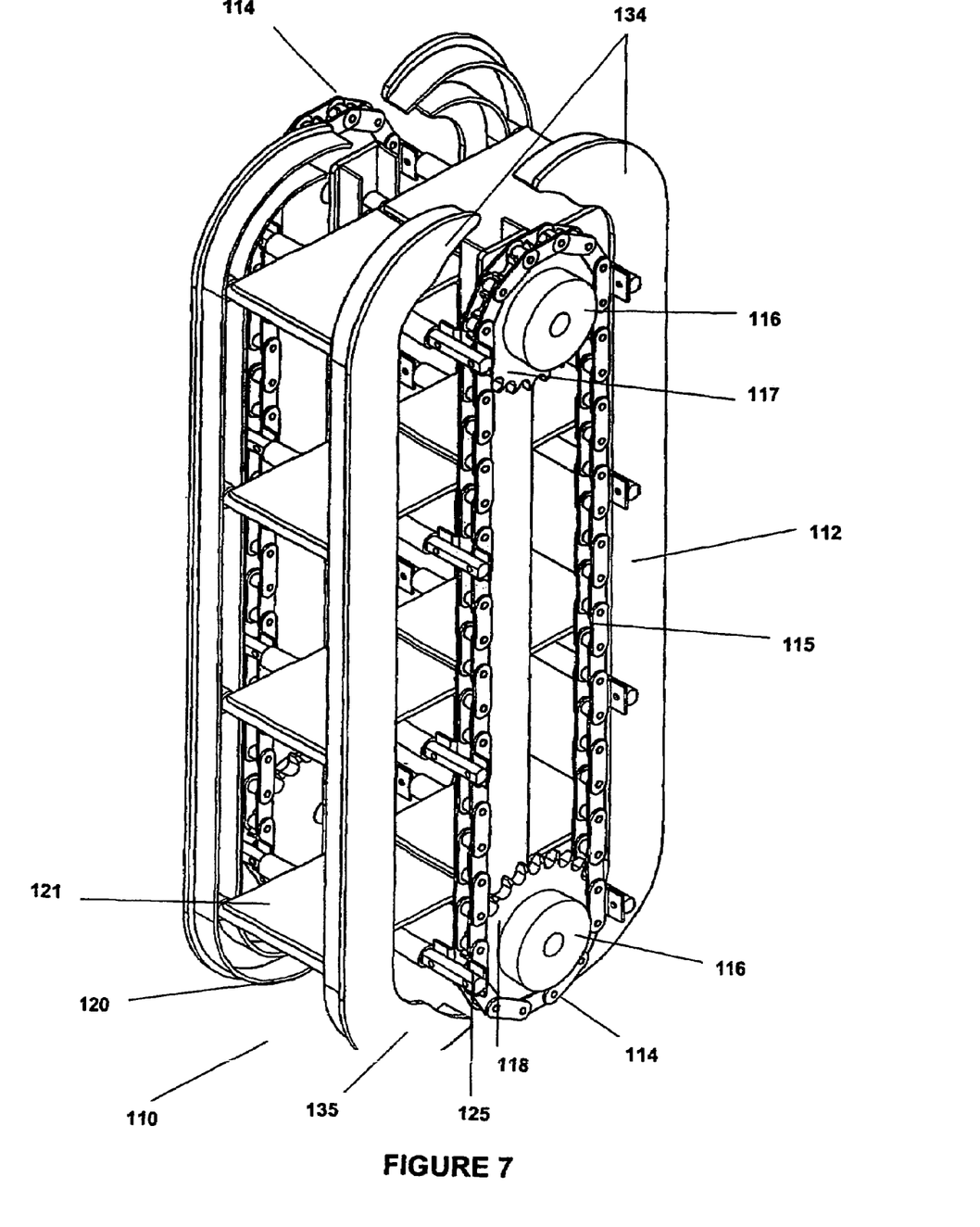
FIG. 7 is a schematic perspective view of conveying apparatus according to a second embodiment of the present invention.
Figure 8:
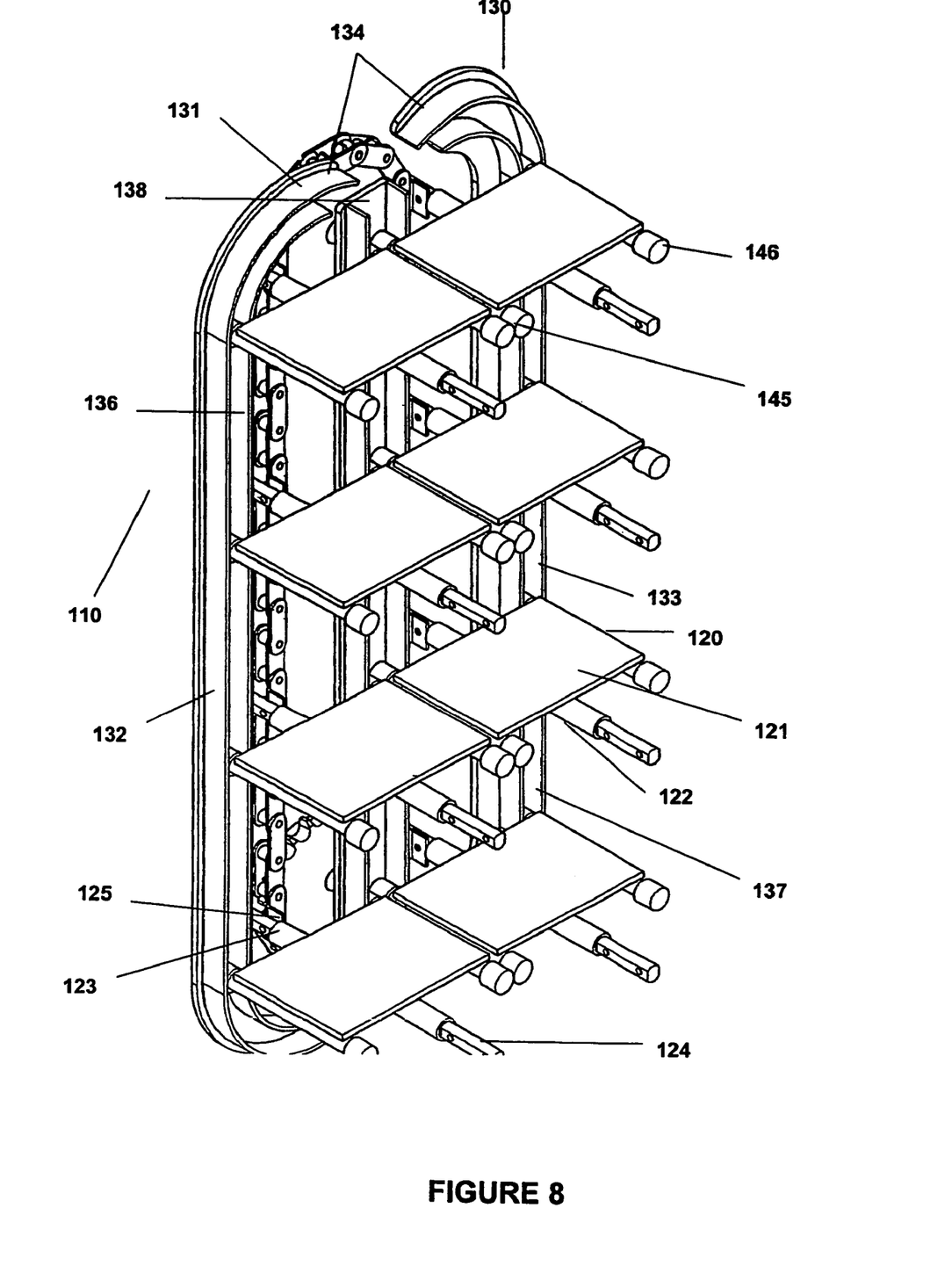
FIG. 8 is a similar view to that of FIG. 7 with part of the apparatus removed.

The apparatus further includes a plurality of article supports 120 in the form of platforms 121 operatively connected to and disposed between the two chains. To this end each platform 121 is operatively connected to a mounting assembly 122 which includes an axle 124 operatively connected at each end to respective chains 115 via a bracket 125. The platform 121 is mounted on a sleeve 123 which in turn is carried on the axle 124 so that it can rotate relative thereto.

The apparatus further includes orientation means 130 which comprises a guide track 131 having two parallel side sections 132 and 133, a central section 138 and opposed end sections 134 and 135. The side sections each comprise a single guide path 136 and 137. The orientation means further includes tracking elements in the form of rollers 145 and 146 which are arranged to track along the guide paths. Tracking rollers 145 and 46 are operatively connected to a platform 121.

Figure 9A:
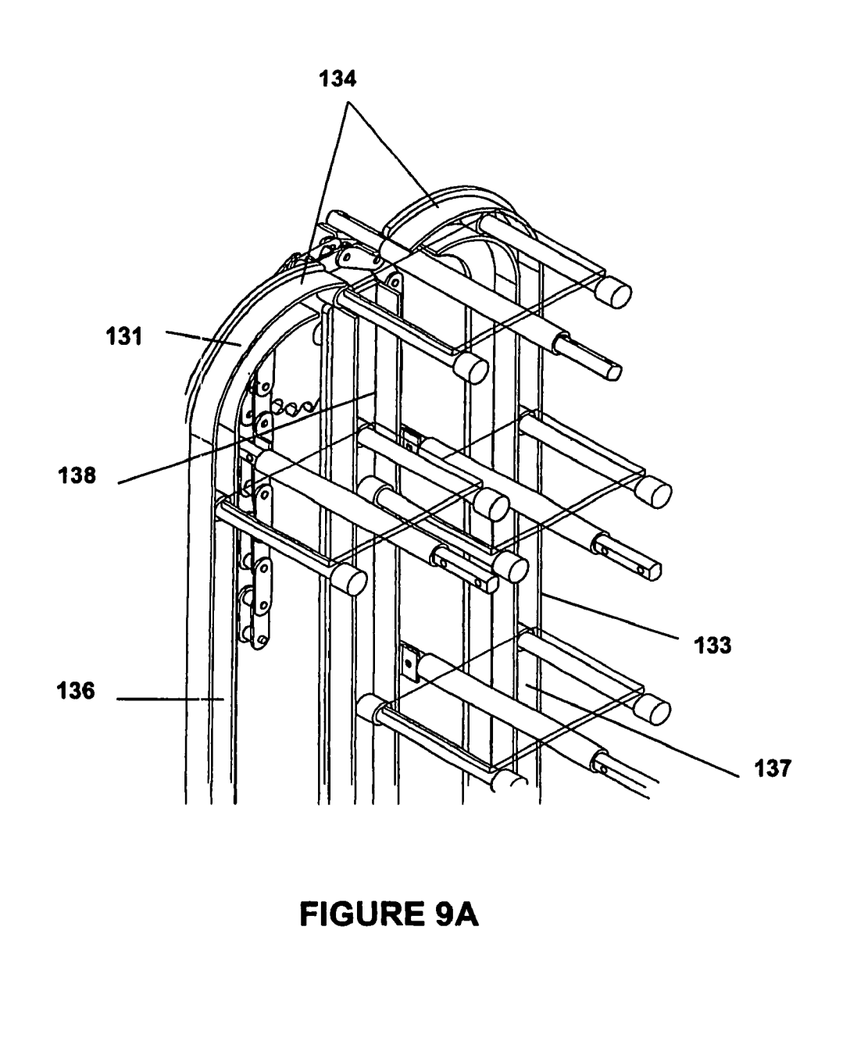
FIGS. 9a, 9b, 10a, 10b and 11a, 11b are schematic side elevations of the apparatus illustrating how the apparatus shown in FIGS. 7 and 8 operates.
Figure 9B:
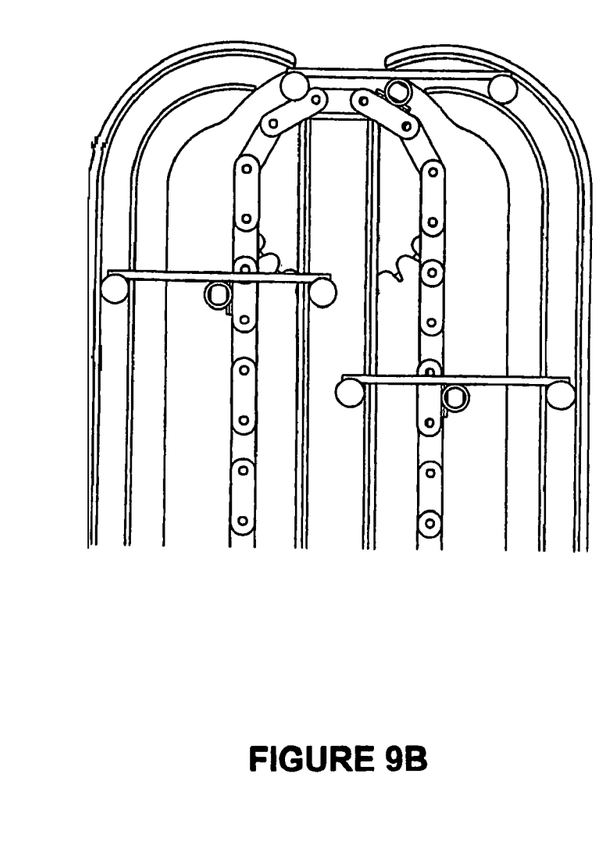
Figure 10A:
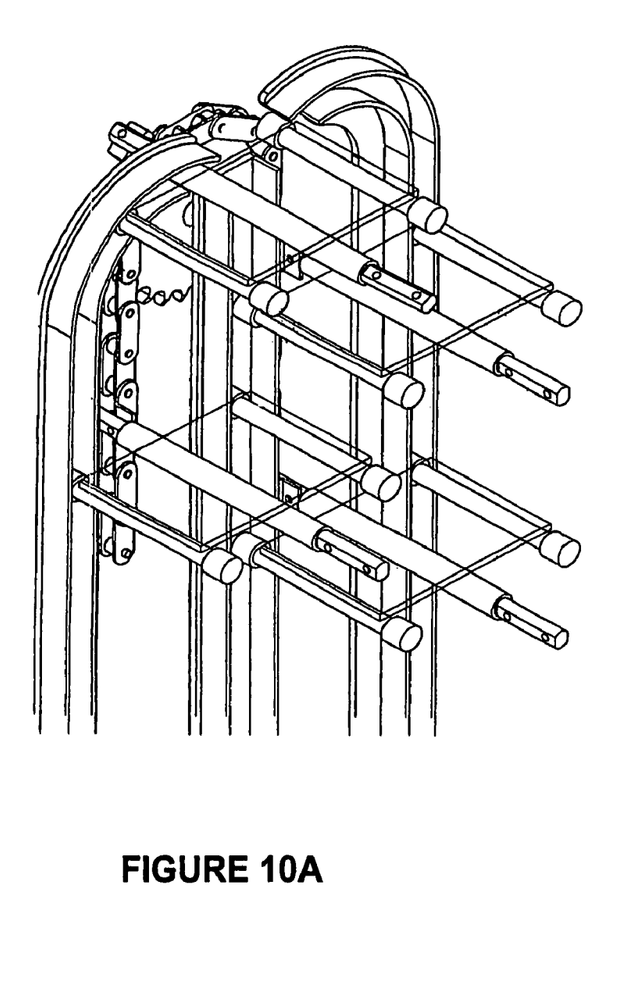
Figure 10B:
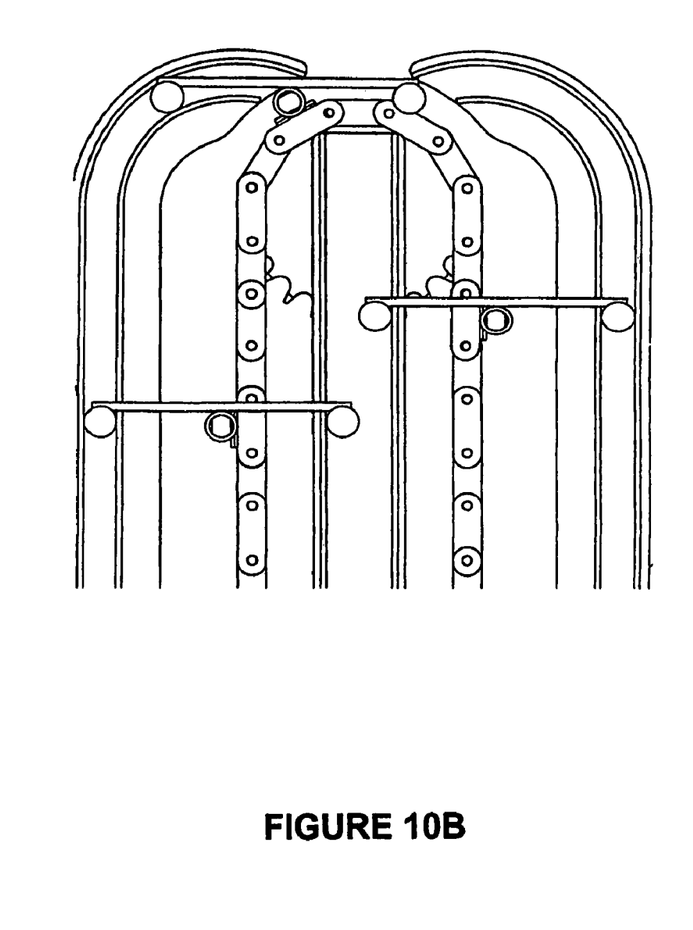
Figure 11A:
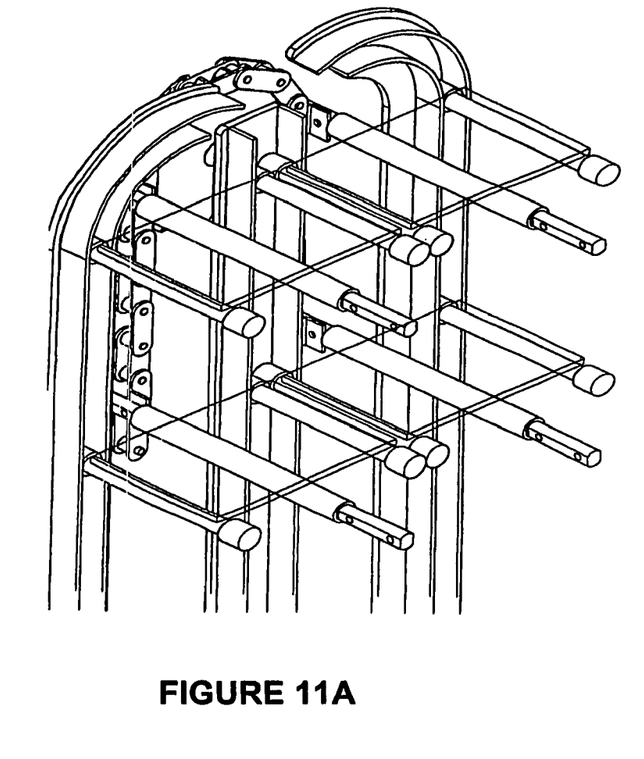
Figure 11B:
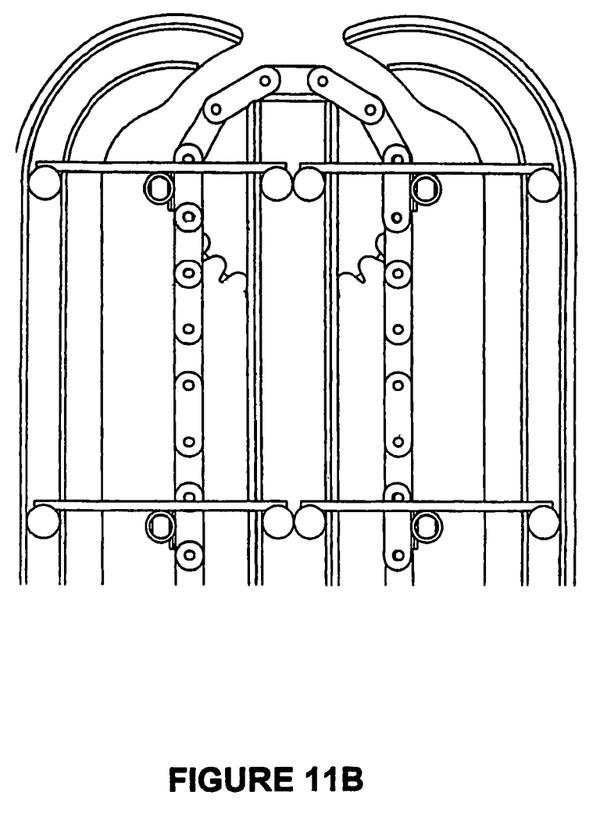
Figure 12:
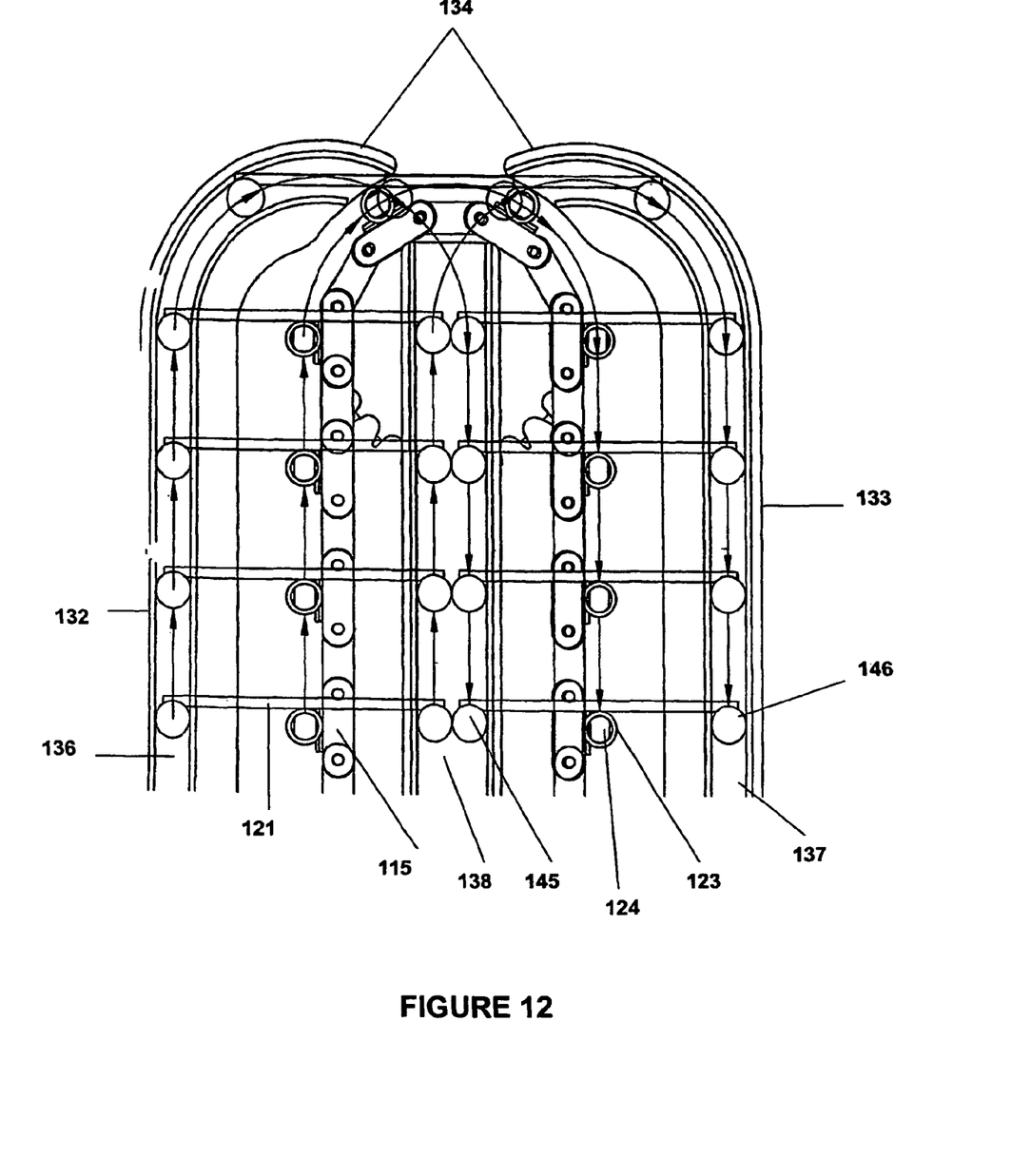
FIG. 12 is a schematic side elevation of the apparatus shown in FIGS. 7 and 8.

The operation of the conveying apparatus according to the embodiment is described with particular reference to FIGS. 9 to 11.

As the claim 115 is driven around the sprockets 117 and 118 the tracking rollers 145 and 146 move along various sections of the guide path. When a platform 121 is disposed within a vertical portion of the guide path one of the tracking rollers 145 is disposed within guide path 136 and the other roller 146 is disposed within the central section 138. As the platform 121 approaches an end section tracking roller 145 is guided into the central section 138 and roller 146 is guided into section 137 thus maintaining the platform 121 in a generally horizontal orientation at all times.

Figure 13:
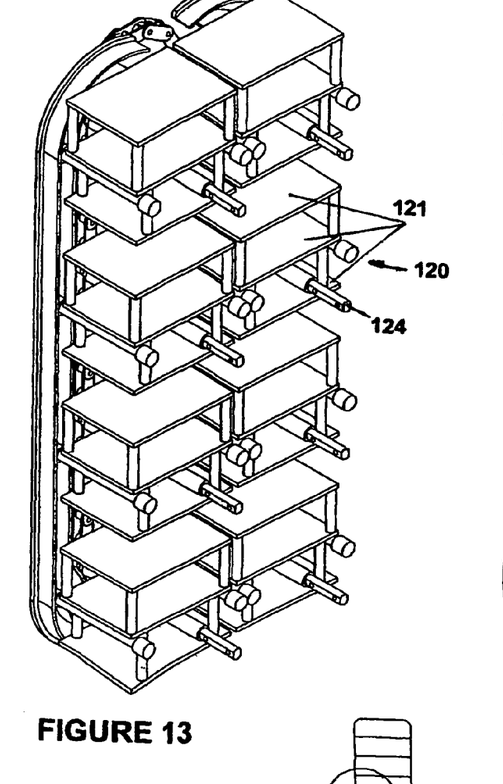
FIGS. 13 to 15 are schematic views of further embodiments of the invention.
Figure 14:
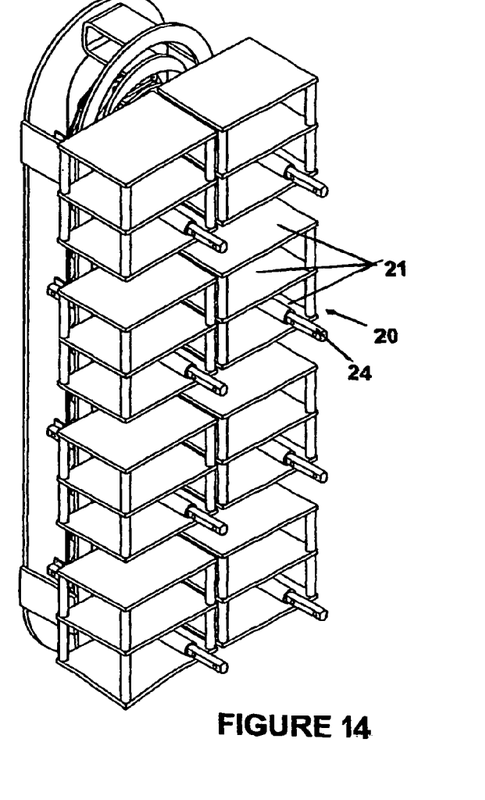
Figure 15:
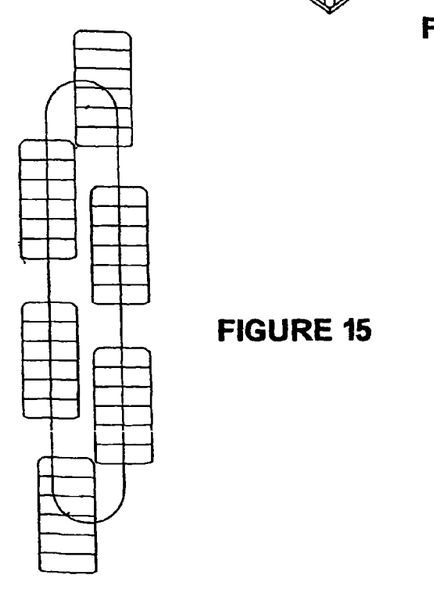

The embodiments shown in FIGS. 13 to 15 are in essence the same as those described earlier except that the carriages or supports 20 or 120 each include a plurality of platforms 21 or 121 which from a single unit carried by one or more axles 24 or 124. In FIGS. 13 and 14 each carriage includes three spaced apart platforms. In FIG. 15 there is shown an arrangement where each carriage includes seven platforms.

As mentioned earlier the apparatus of the present invention is suitable for use in many applications. For example the apparatus could be used for the dispatch, storage and retrieval of vehicles in a multi-story building or vertical car park. The car park may have a computerised control system that enables operator free dispatch, retrieval and card charge payment in combination with excellent security. The apparatus could also be used to dispatch, store and retrieve documents/books in multiple vertical horizontal or inclined layers with a computer controlled system that provides a coded security system restricting personnel to specific levels and availability of documents/books. Another example is in its use as a passenger elevator in a multi-story situation with multi passenger cars simultaneously ascending and descending in the one lift-well. Computer operation and destination is effected by passenger or operator control. The apparatus may allow for emergency exit stairwells to be located in a vertical plane in the center of lift-well allowing the disembarking of passengers in an emergency at any level of the total lift height. Lift/elevators can be configured enabling every level of a multi-story building to have an elevator that is always ascending and descending. Yet another example is to dispatch store or retrieve products on multiple levels in vertical horizontal or inclined planes thereby efficiently utilizing a given cubic space/area. It may be fitted with computerised control to enhance security and speed of operation. Another example is that it could be utilised on aircraft carriers for quickly raising and lowering aircraft to and from the deck and hull of sea going vessels. It can also be used on civilian or commercial vessels for the movement or storage of people, vehicles, products.

The conveying apparatus of the present invention as shown in the drawings is able to utilise for conveying or storage the total depth of any given site. Furthermore, the conveyor apparatus is designed to have the conveyed weight in a vertical direction centred through the lifting and lowering transmission element so that any guidance system only has to balance any weight variation on any carriage. This also enables the rolling on or off of loads for conveying without torque twisting of the transmission element. There is no lateral or angular tension added to the vertical load weighting of the conveyor lifting or lowering transmission element. The conveying apparatus can change the plane of the carriage during the movement through horizontal or angular sections of the circuit. Finally, the service or replacement of lifting componentry eg. bearing, bushes, guides, shafts can be replaced from the external side of the guide system without the need to unload the conveyor/storage systems.

Finally, it is to be understood that various alterations, modifications and/or additions may be incorporated into the various constructions and arrangements of parts without departing from the spirit or ambit of the invention.

The invention claimed is:

1. Apparatus for conveying articles the apparatus including transmission means which includes an endless transmission element; a plurality of element guide means around which the transmission element extends; drive means for moving the transmission element; a plurality of article carriages operatively directly connected to the transmission element for movement therewith; and orientation means for maintaining the article carriages in a selected orientation as they move along the conveying path, the apparatus including a primary support element, said primary support element including an axle operatively connected to the transmission element through a mounting bracket, the carriage associated therewith being secured to a sleeve disposed on the axle for relative rotation thereto.

2. Apparatus according to claim 1 including a mounting assembly associated with each article carriage, each mounting assembly including a primary load support member to which an associated article carriage is mounted, each said primary load support member being operatively connected to the transmission element substantially at a position adjacent to the transmission element.

3. Apparatus according to claim 2 wherein each said article carriage is operatively mounted to the primary load support member with which it is associated at a position such that bending moments resulting from the weight of the article carriage are minimised.

4. Apparatus according to claim 2 wherein each said article carriage includes a platform section, said load support member being disposed intermediate opposed ends of said platform section.

5. Apparatus according to claim 2 wherein each said article carriage includes a plurality of platform sections disposed in spaced relation and one above the other, said load support member being disposed intermediate opposed ends of one of said platform sections.

6. Apparatus according to claim 5 wherein two or more said load support members are provided each being associated with a respective one of said carriages.

7. Apparatus according to claim 2 wherein two said transmission elements are provided which are arranged in spaced apart relation said primary load support members being operatively connected to both said transmission elements and extending therebetween.

8. Apparatus according to claim 1 wherein two said guide means are provided, one above the other and in spaced relation to one another.

9. Apparatus according to claim 8 wherein the element guide means are in the form of wheels around which the endless transmission element extends.

10. Apparatus according to claim 8 wherein the endless transmission element is in the form of a chain and the guides include chain sprockets.

11. Apparatus according to claim 1 wherein the drive means is operatively connected to one of the element guide means for causing rotation thereof and in turn movement of the endless transmission element.

12. Apparatus according to claim 1 wherein the orientation means includes a guide track having two parallel side sections and opposed end sections, the side sections each comprising a single guide path and each end section comprises three guide paths, and tracking elements in the form of rollers which are arranged to track along the guide paths.

13. Apparatus according to claim 12 wherein the tracking rollers are operatively connected to a support link which in turn is operatively connected to the sleeve.

14. Apparatus according to claim 1 wherein the orientation means includes a guide track having two parallel side sections, a central section and opposed end sections, the side sections each comprising a single guide path, and tracking elements in the form of rollers which are arranged to track along the guide paths, the tracking rollers being operatively connected to a platform.

* * * * *